No. 769,586. PATENTED SEPT. 6, 1904.
U. A. BOWMAN.
FRUIT CORER AND DIVIDER.
APPLICATION FILED OCT. 26, 1903.
NO MODEL.
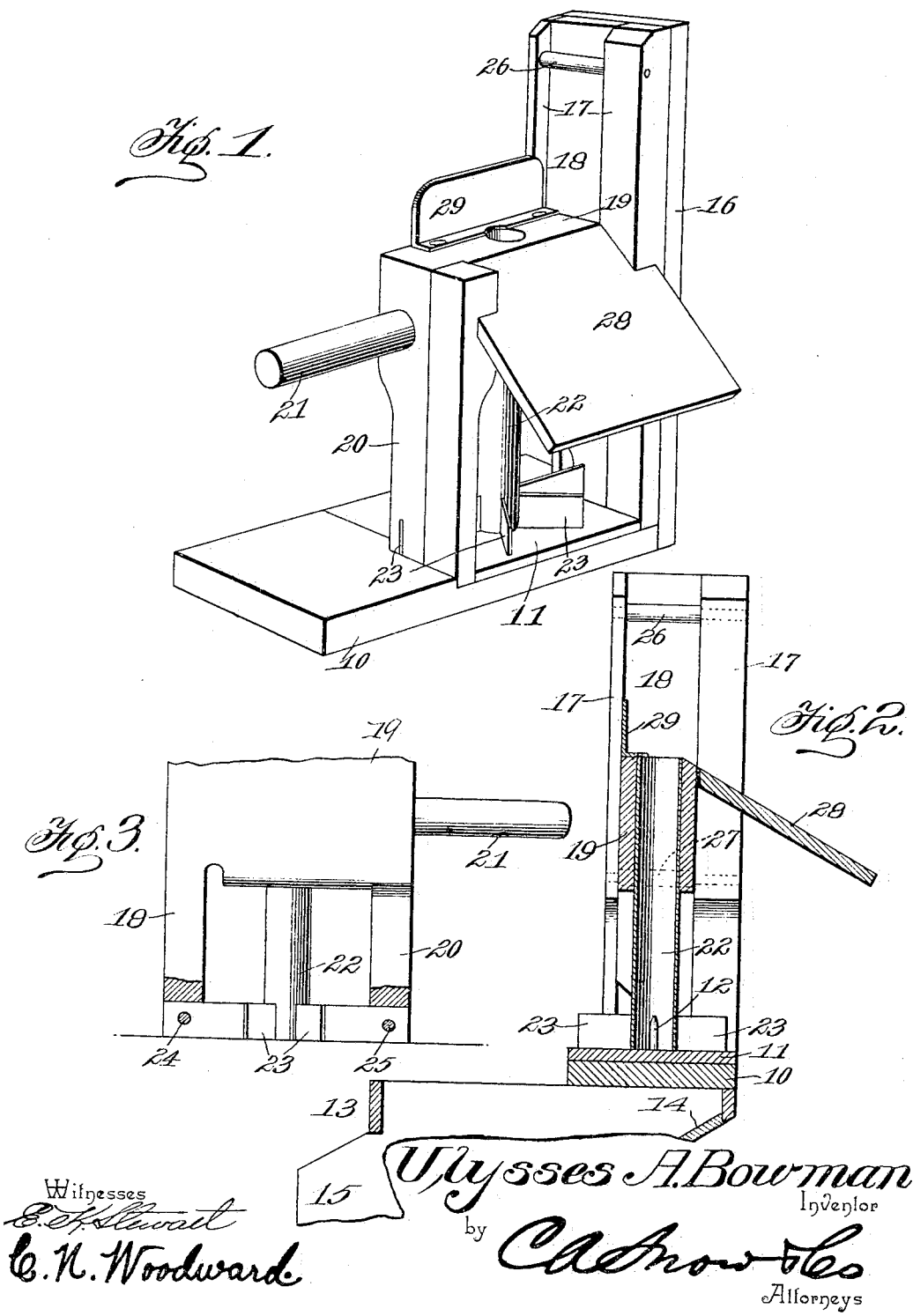
Witnesses
E. F. Stewart
C. N. Woodward
Ulysses A. Bowman
Inventor
by C. A. Snow & Co.
Attorneys No. 769,586.  
Patented September 6, 1904.

UNITED STATES PATENT OFFICE.

ULYSSES A. BOWMAN, OF TOMPKINSVILLE, KENTUCKY.

FRUIT CORER AND DIVIDER.

SPECIFICATION forming part of Letters Patent No. 769,586, dated September 6, 1904.

Application filed October 26, 1903. Serial No. 178,634. (No model.)

*To all whom it may concern:*

Be it known that I, ULYSSES A. BOWMAN, a citizen of the United States, residing at Tompkinsville, in the county of Monroe and State of Kentucky, have invented a new and useful Fruit Corer and Divider, of which the following is a specification.

This invention relates to devices employed for coring and dividing fruit, and has for its object to simplify and improve implements of this character and produce a device efficient of action, easy of operation, which will not become clogged or easily broken, and wherein when the parts are worn or broken they may be renewed at small expense and little trouble.

The invention consists in certain novel features of construction, as hereinafter shown and described, and specified in the claims.

In the drawings illustrative of the invention, in which corresponding parts are denoted by like designating characters, Figure 1 is a perspective view of the improved device. Fig. 2 is a longitudinal sectional side elevation. Fig. 3 is a side view of the movable cutter-carrying head and the cutter in position therein.

The improved device comprises a table member 10, having a detachable cutting-board 11, provided with a central pin 12, on which the fruit to be cored and divided is impaled.

The table member is preferably mounted over a receptacle 13 at or near one edge, the receptacle having an inclined bottom 14 and discharge-chute 15, with the table 10 preferably located above the highest point of the inclined bottom, as shown. Mounted on one end of the table 10 is a standard 16, having spaced guideways 17, between which a bar member 18 is adapted to slide vertically. Extending laterally from the bar 18 is an arm 19, preferably located intermediately of the ends of the bar and terminating in a vertical projection 20, spaced from the bar 18 and parallel thereto, as shown. A handle 21 is attached to the arm 19, by which the bar and its connections may be operated. The coring and dividing member comprises a tubular central portion or "corer" 22, extending at one end through the arm 19 and provided at the other end with a plurality of cutting-blades 23 radiating therefrom, two of the blades extending into recesses formed for them respectively in the members 18 20 and secured therein, as by pins or rivets 24 25, as shown. By this means the parts are firmly united and supported and the blades prevented from lateral displacement, as will be obvious.

Any number of the blades and any sized corer may be employed, and by furnishing a plurality of graduated sizes of corers and number of blades the implement may be quickly adjusted to different sizes of fruit and to prepare fruit for different kinds of treatment.

For small apples and similar fruit four of the blades and a comparatively small corer will be employed; but for the larger fruit a larger corer and a greater number of cutting-blades will be employed; but this would not be a departure from the principle of the invention, and I do not, therefore, wish to be limited to any specific number of the blades or size of corer to be employed.

The standard 16 and its guides 17 extend for considerable distance to increase the length of the guiding-surface and the lateral arm 19, located intermediately of the ends of the bar 18. The action of the device is very steady and uniform and all lateral play is obviated.

Extending transversely through the guides 17 in advance of the bar 18 and above and below the arm 19 are combined stop and guide pins 26 27, which serve to support and guide the bar in its movement between the guides 17; but the lower pin 27 also serves as a stop to limit the upward movement of the bar and its attachments.

Extending from the rear side of the device is an inclined core-chute 28, down which the cores roll when ejected from the upper open end of the tubular member 22, and to insure their passage to the chute a guard-plate 29 is placed upon the arm 19 at the forward side of the discharge end of the corer. By this simple arrangement an apple, pear, or similar fruit impaled upon the pin 12, with the combined corer and divider forced downward upon it by the handle 21, will be quickly cored and divided into as many parts as there are blades 23, the core remaining in the tube 22 and the divided pieces falling into the receptacle 13. At the next action the first core will be forced upward by the next core, and so on, the cores being finally ejected and passing over the chute 28, as above noted.

The parts are very simple in construction, can be cheaply constructed, and will very effectually perform the work required of them.

The parts may be of any required material, wood or metal or compounds of wood and metal, and may be constructed and supplied to the trade with or without the receptacle 13, as may be desired.

Having thus described the invention, what is claimed is—

1. A fruit corer and divider comprising a table having a standard formed with spaced guide members, a bar mounted for movement between the members and provided with an arm extending laterally therefrom intermediate of its ends and terminating in a vertical projection spaced from the bar, guide-pins connecting the spaced guide members above and below the lateral arm, and a coring and dividing member comprising a tubular central portion extending at one end through the lateral arm and provided at its other end with cutting-blades.

2. A fruit corer and divider comprising a table having a standard formed with spaced guide members, a bar mounted for movement between said guide members and provided with an arm extending laterally therefrom intermediate of its ends and terminating in a vertical projection spaced from said bar, guide-pins connecting said spaced guide members in advance of said bar above and below said lateral arm, and a coring and dividing member comprising a tubular central portion extending at one end through said lateral arm and provided at the other end with radiating cutting-blades two of which are extended into connection respectively with said bar and vertical projection.

In testimony that I claim the foregoing as my own I have hereto affixed my signature in the presence of two witnesses.

ULYSSES A. BOWMAN.

Witnesses:
R. G. BAILEY,
W. S. SMITH.